(12) United States Patent
Lim et al.

(10) Patent No.: US 6,785,838 B2
(45) Date of Patent: Aug. 31, 2004

(54) METHOD AND APPARATUS FOR RECOVERING FROM FAILURE OF A MIRRORED BOOT DEVICE

(75) Inventors: Swee Boon Lim, Cupertino, CA (US); Devendra R. Jaisinghani, Fremont, CA (US); Sanjay G. Nadkarni, Louisville, CO (US); Robert Gittins, Westminster, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 570 days.

(21) Appl. No.: 09/782,572

(22) Filed: Feb. 13, 2001

(65) Prior Publication Data

US 2002/0112198 A1 Aug. 15, 2002

(51) Int. Cl.[7] ................................................ G06F 11/00
(52) U.S. Cl. ................................................ 714/7; 714/6
(58) Field of Search ................................. 714/5, 6, 7, 8

(56) References Cited

U.S. PATENT DOCUMENTS

| | | | | |
|---|---|---|---|---|
| 5,432,927 A | * | 7/1995 | Grote et al. | 713/2 |
| 5,615,330 A | * | 3/1997 | Taylor | 714/7 |
| 6,430,663 B1 | * | 8/2002 | Ding | 711/162 |
| 6,477,629 B1 | * | 11/2002 | Goshey et al. | 711/162 |
| 6,542,962 B2 | * | 4/2003 | Kodama et al. | 711/114 |

OTHER PUBLICATIONS

White, Ron. "How Computers Work", Que, 6th Edition, pp. 20–23.*

* cited by examiner

Primary Examiner—Nadeem Iqbal
Assistant Examiner—Timothy M. Bonura
(74) Attorney, Agent, or Firm—Park, Vaughan & Fleming LLP

(57) ABSTRACT

A system and method are provided for recovering from the failure of a mirrored boot device (e.g., disk drive). One method is implemented for a computer system that mirrors two (or more) boot devices. If one of the devices fails, a set of compensating activities is performed, which may include removing the failed device from the list of devices from which the system may boot, deleting mirror state data from the device and removing the failed device from the mirroring scheme. After the failed device is repaired or replaced, a set of reintegrating activities is performed, which may include including the device in the mirroring scheme, restoring mirror state data to the device and adding the device to the list of boot devices. Even if the system includes only two mirrored boot devices and one of them fails, it can continue operation and can reboot successfully without using stale data.

59 Claims, 4 Drawing Sheets

METHOD AND APPARATUS FOR RECOVERING FROM FAILURE OF A MIRRORED BOOT DEVICE

BACKGROUND

This invention relates to the field of computer systems. More particularly, a system and methods are provided for recovering from the failure of a disk in a set of mirrored boot disks.

Many computing environments require high availability of storage resources. This is often accomplished by mirroring data across multiple physical storage devices (e.g., disk drives). A computer system may read from and write to a set of mirrored disks as a single logical disk drive. However, the contents that are written to the logical drive are actually written to each of the physical devices, and a read may be made from any of the devices. As a result, if one disk in the set fails, another can be used in its place, and provide the same data, without halting the system.

Traditionally, at least three devices have been included in a mirror set in order to allow the host computer system to continue operating after one device fails, or to reboot before a failed device is replaced. Systems usually require a minimum of three devices because they operate on a quorum basis, with each device having one "vote." A majority of devices (e.g., two) must be available so that the system can identify which device(s) contain valid data or distinguish stale data (or a device holding stale data) from fresh data. If only one disk is available (e.g., two have failed), the system cannot determine whether it contains fresh or stale data, and the system may be configured to cease or prevent operation.

Further, existing disk-mirroring schemes suffer from the possibility that the host computer system may boot from a device having stale data. In a computer system that can boot from multiple devices (e.g., any one of a set of mirrored boot disks), the order in which the system should attempt to boot from each device is usually specified. With existing schemes, if the first device in the order fails during operation of the computer system and is not repaired or replaced before the system reboots, the system may attempt to boot from the device. And, if the device exhibits only intermittent failures, the system may be able to boot from it. However, because the device was considered failed before rebooting, it may not have received all data updates or configuration changes, in which case the system will boot and operate with stale data.

Also, some computing environments that require high availability of storage or boot devices may have space limitations that make it difficult to install or accommodate more than two devices. For example, many computer systems employed in such environments are configured to contain two internal disk drives and, if more are needed, they must be attached or housed in a separate enclosure.

The procedures or instructions for mirroring a set of disks are often encoded in hardware (e.g., firmware), such as within a controller that controls the disks or within a subsystem that includes the disks. However, this arrangement limits the flexibility of the mirroring operations. If, for example, the instructions include the automatic performance of one or more procedures or commands, a system operator typically cannot override them in order to perform them manually (e.g., with different parameters or in a different order).

SUMMARY

Thus, in one embodiment of the invention a system and methods are provided for facilitating the mirroring of a limited number of storage devices (e.g., two), such that the system can continue operation if one device fails and, if the system is rebooted prior to repair or replacement of the failed device, the system will not attempt to boot from the failed device, thus preventing it from operating with stale data. Further, the methods may be implemented in software, thus enabling flexibility in the operation of the mirroring and recovery from a failed device. For example, a recovery procedure may be performed manually or automatically, or selected portions of the procedure may be accomplished manually, while other portions are performed automatically.

In one embodiment of the invention, a method of recovering from the failure of a mirrored boot device includes a set of compensating actions that are performed after the failure is detected. Then, after the device is repaired or replaced, a set of reintegrating actions are performed.

Compensating actions may include removing the failed device from a set of devices from which the system may boot, and attempting to remove the failed device from the mirroring scheme. Removing a device from the mirroring scheme may require the deletion of mirror configuration or status data from the device and the updating of such data on the remaining device(s) in the scheme.

Reintegrating actions may include retrieving mirror status data from another mirrored device and recreating the necessary configuration on the repaired or replacement device. After the device joins the mirroring scheme, it may then be added to the set of devices from which the system may boot.

In various embodiments of the invention, different phases of a recovery procedure (e.g., detection of failure, compensating actions, reintegrating actions) may be performed manually or automatically. A system administrator or operator may, therefore, select an appropriate policy specifying the manner (e.g., automatic or manual) in which each phase should be performed.

DETAILED DESCRIPTION

Figure 1A:
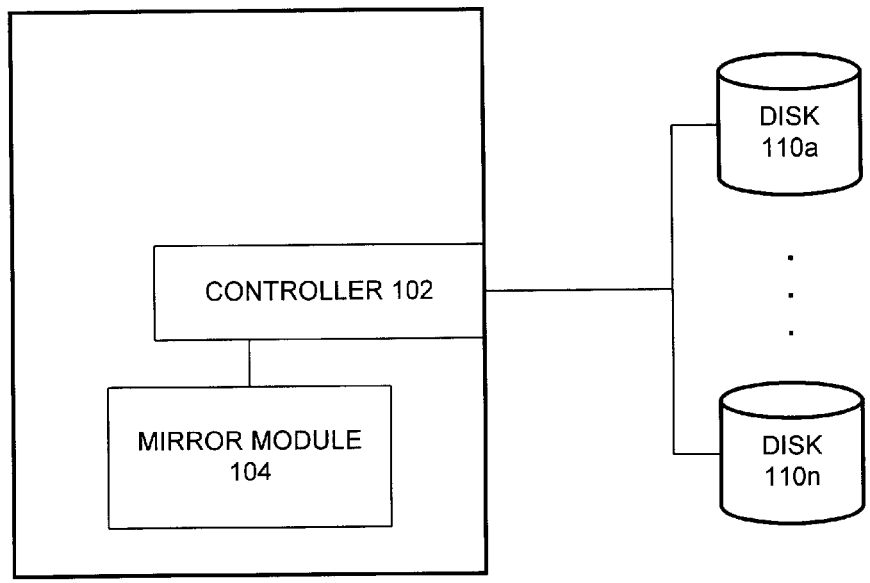
FIGS. 1A–B are block diagrams depicting illustrative computer systems for mirroring boot devices, wherein the systems may recover from the failure of a mirrored device, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a clustered system configured for high availability, small footprint, low maintenance cost, etc. Details of such devices (e.g., processor, memory, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention, a system and methods are provided for mirroring multiple computer system boot devices (e.g., disk drives) and recovering from the failure of one of the mirrored devices without allowing the system to boot from the failed device and thereby operate with stale data. This embodiment is particularly configured for a mirror set consisting of just two devices, although other embodiments may be configured for mirror sets containing more than two devices. Regardless of the number of devices that may be included in a mirror set, however, the system can continue to operate and can be rebooted while only one device is available. Further, the methods of this embodiment may be implemented in software, while the methods of other embodiments of the invention may be implemented partially in software and/or hardware.

In one implementation of this embodiment, the mirrored boot devices participate in a set of one or more mirrors, with each mirror representing one logical device partition. Each mirror comprises multiple sub-mirrors (e.g., one on each device), corresponding to physical partitions on the individual devices. Mirrors and sub-mirrors may be referred to as metadevices. Further, each device stores one or more replicas or copies of a state database that stores information regarding the mirror set. The data in the state database may identify the participating boot devices and defined metadevices, the status or configuration of each device and metadevice, etc. Each mirrored boot device, and its metadevice components (e.g., sub-mirrors) may be identified to the system by unique labels or serial numbers. Device identifiers may be obtained by the system by polling or reading from each device, while metadevice identifiers may be assigned by users or a software module performing the mirroring.

The partitions of each boot device may contain various types of system files and/or data. Because the host computer system boots from the mirrored devices, it may be very important to ensure that the system only boots from a device having up-to-date (fresh) information. Otherwise, the system may operate with stale data that may affect its performance, security, accounting, etc. Illustratively, a boot device may be considered as having failed if one or more sub-mirrors or state database replicas on the device have failed.

In one embodiment, when a boot device in a set of mirrored devices fails, that device is removed from a list of devices from which the host computer system will attempt to boot. The device is not returned to the list until it is repaired or replaced and its partitions reintegrated into the mirroring scheme. As a result, if the system is rebooted or crashes after a device fails, but before it is repaired or replaced, the system will only boot from a device that has not failed. The system thus cannot boot or even attempt to boot from a device that has failed. Further, when a boot device fails, it may be dropped from the mirroring scheme. As a result, despite the inaccessibility of the failed device, a single remaining device can constitute a quorum. This embodiment may be well suited for a computer system or environment that demands high availability and yet requires the system to always operate with fresh data.

Figure 1B:
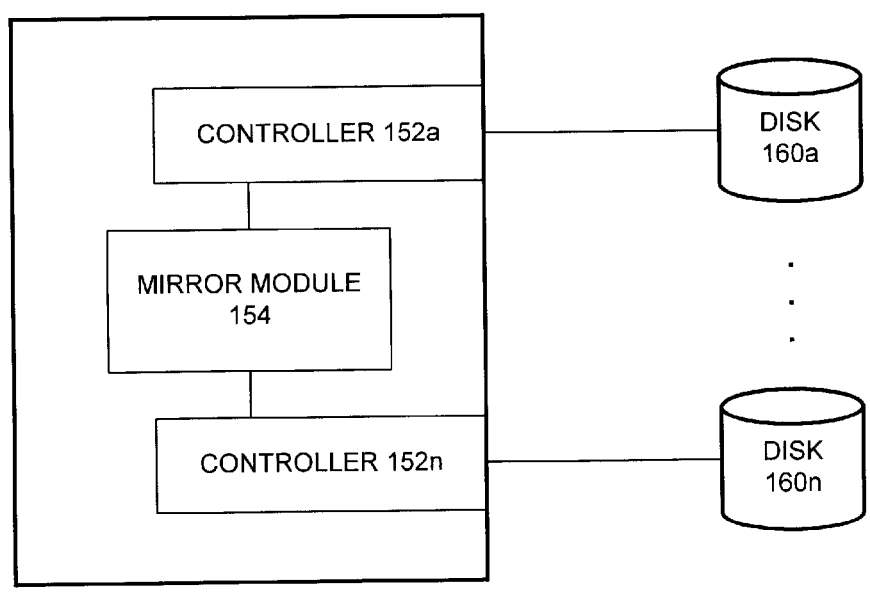

FIGS. 1A–1B depict illustrative computer systems in which embodiments of the invention may be implemented. Computer system 100 comprises multiple storage devices (e.g., disks) 110a–110n from which the system may boot. Controller 102 controls operation of the multiple devices. Mirror module 104 of system 100 performs or monitors the mirroring of the boot devices.

Computer system 150 of FIG. 1B also comprises multiple boot devices 160a–160n, but each boot device is coupled to its own controller (e.g., controller 152a, controller 152n). As in system 100, the mirroring of boot devices in system 150 is performed or monitored by mirror module 154. The mirror modules may comprise sets of software instructions or, in alternative embodiments, may be encoded in firmware or hardware.

In a computer system such as system 100 of FIG. 1A or system 150 of FIG. 1B, the boot devices are mirrored, meaning that data stored on one device is also stored on the other. As a result, the contents of the devices will be substantially identical, thereby allowing the system to boot and operate from either device.

One embodiment of the invention is implemented within a computer system that includes just two mirrored boot devices (e.g., disk drives). Each boot device comprises one or more similarly configured partitions. Each such partition defines a sub-mirror and each pair of corresponding sub-mirrors constitutes a mirror. Thus, a given mirror may be considered a logical partition of a boot device, with each sub-mirror in that mirror corresponding to one physical representation of that partition. Multiple mirrors may be defined (i.e., one mirror for each partition that is common to both devices) and, further, both boot devices may be partitioned identically. In alternative embodiments of the invention, a sub-mirror may include multiple partitions on a single device and the devices need not be partitioned identically.

As described above, configuration and/or status information is stored in the form of a state database that is replicated on the mirrored devices. The state database replicas may include information identifying the partition configuration of a boot device, the metadevices (e.g., mirrors, sub-mirrors) defined for a mirroring scheme, the number and/or locations of state database replicas, etc. Illustratively, multiple copies of the state database may be stored on each device. In one embodiment, at least three replicas are stored on each device, possibly in different partitions or sub-mirrors. Each replica is updated when the status or configuration of a mirror changes, and the updates may be performed sequentially (e.g., rather than in parallel) to avoid having multiple replicas corrupted in the event of a system failure.

In one embodiment of the invention, the method of recovery from a boot device failure cooperates with, but is separate from, the actual mirroring operations involving the boot devices. In particular, a present embodiment is configured for operation in a SunCluster™ environment running the Solaris™ operating system and using Solstice™ DiskSuite for device mirroring. Illustratively, the various mirroring metadevices are created by or with DiskSuite.

In this environment, a plurality of state database replicas (e.g., three) is required on each boot device, and at least half of the replicas stored on the devices should be available in order to determine which device, if any, possesses valid data. Without at least half of them available, the system may not be able to reboot, because it may not be able to determine which device has current data.

Therefore, as described below, when a mirrored boot device fails in this environment, its sub-mirrors and state database replicas are removed, and the remaining replicas (on the good device) are updated to reflect the change in configuration of the mirroring scheme and the number and location of state database replicas. Information concerning the number of state database replicas and/or their location may be saved (i.e., on the unfailed device), and may be used to restore the same configuration after the failed device is repaired or replaced. Further, a failed device is removed from a list or collection of devices the system may boot from. Thus, even if the state database replicas could not be removed from the device (e.g., it is completely inaccessible), the system cannot attempt to boot from it.

In an environment such as that just described, the mirroring metadevices and state database replicas may be configured by the software or hardware module performing the mirroring (e.g., Solstice DiskSuite), in which case the recovery method is designed to work within the configuration parameters (e.g., by invoking the appropriate procedure of the mirroring module). For example, the recovery procedure may invoke the mirroring module to recreate sub-mirrors and state database replicas and resynchronize mirrors after a failed device is replaced, to resume mirroring, etc. In an alternative embodiment, however, the recovery method may perform any of these actions.

In one embodiment of the invention in which there is an even number of boot devices being mirrored (e.g., two), and each device stores an equal number of state database replicas (e.g., three), an additional measure may be taken to keep the system operational in the event that half of the devices (e.g., one) fail and their state database replicas cannot be removed. In particular, if one of two mirrored boot devices becomes totally inaccessible, the system may not be able to remove its replicas. Although that device is then removed from the boot device list, the mirroring module (e.g., Solstice DiskSuite) may not be able to easily determine which device contains good data, because each device has three state database replicas that agree with each other, but which differ from the other device's replicas. Thus, in this embodiment, when this situation occurs the mirroring module will examine the boot device list and assume that the device that is in the list is the valid device.

Figure 2:
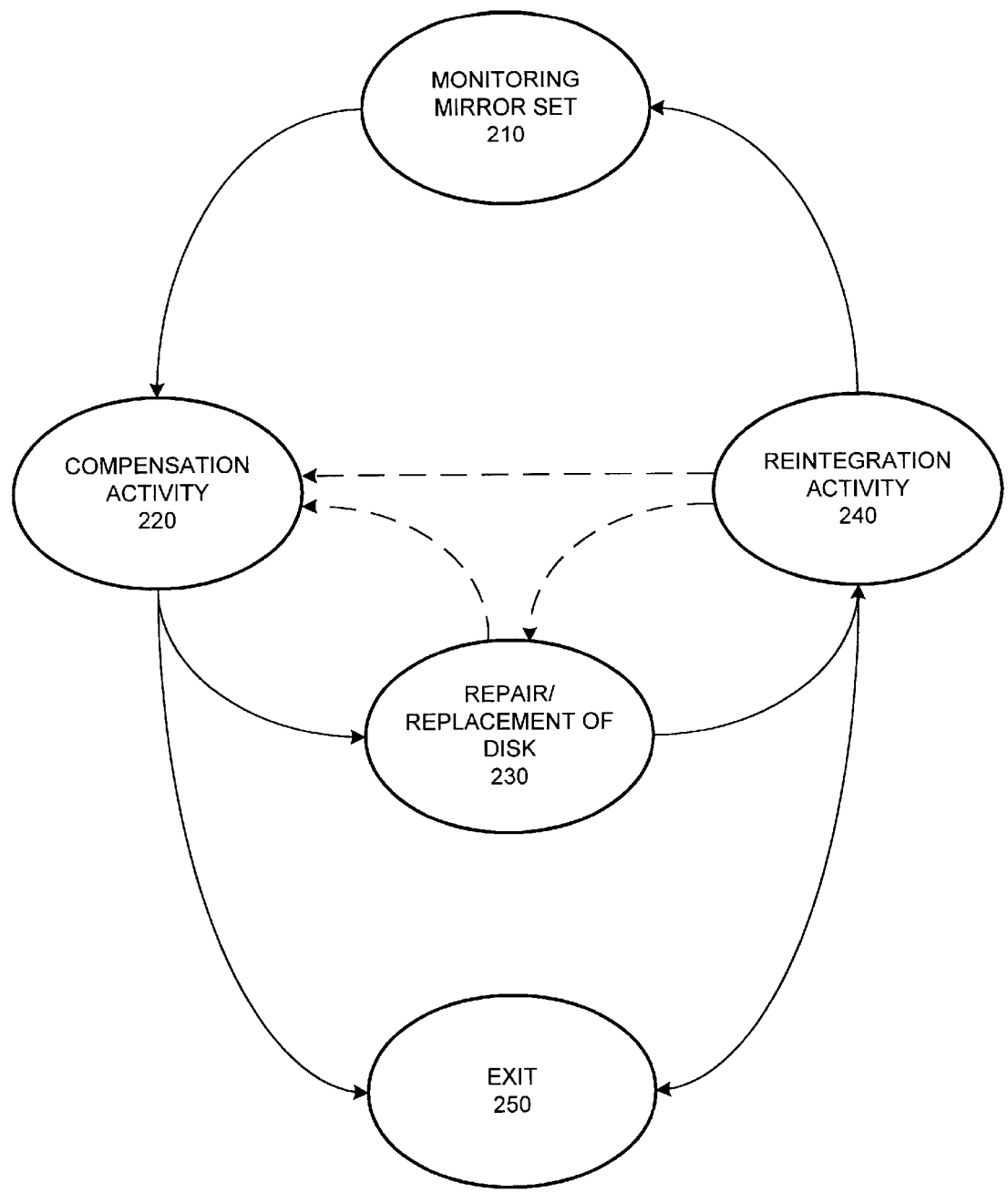
FIG. 2 is a state diagram illustrating recovery from the failure of a mirrored boot device in accordance with an embodiment of the invention.

FIG. 2 is a state diagram demonstrating a method of recovering from the failure of a mirrored boot device, according to one embodiment of the invention. In this embodiment, in state 210 the status of a set of multiple (e.g., two) boot devices (e.g., disk drives) is monitored. Monitoring the mirror set may include activity such as testing or waiting for a device failure (e.g., a read or write error), comparing the status or contents of state database replicas stored on the devices, etc.

State 210 may be preceded by a Start state in which configuration and/or status information is stored in the state database replicas. The state database may include information regarding mirrors and/or sub-mirrors (e.g., the device partitions to be mirrored, devices to participate in mirroring), the number and/or locations of state database replicas, etc.

In one embodiment of the invention, at least two boot devices are mirrored, each boot device comprises one or more partitions, and one mirror may comprise any number of partitions that are mirrored across the participating devices. Illustratively, however, each device participating in a mirror will possess the same partition arrangement or structure. Thus, each defined mirror will comprise at least two sub-mirrors—one for each of the participating devices.

In FIG. 2, when the failure of a mirrored boot device is detected (e.g., a read or write failure is detected), the system transitions from monitoring state 210 to compensation activity state 220. The compensation activity state is described in further detail below with reference to FIG. 3, and includes activity intended to remove the failed device from its mirror set(s) and allow the system to reboot without the device. State 220 may also include testing of the device to ensure that it has failed. If the compensation activities are unsuccessful, the system may transition to exit state 250. Otherwise, if the activities are successful, the system transitions to repair state 230, in which the failed device is repaired or replaced. After a successful repair state, the system transitions to reintegration activity state 240.

In reintegration activity state 240, the new or repaired boot device is configured to rejoin a mirror set. The reintegration activity state is described further in conjunction with FIG. 3, but may include creating and attaching sub-mirrors, resynchronizing with other mirrored devices, etc. If reintegration activity state 240 is successful, the system transitions back to monitor state 210. If unsuccessful, the system transitions to exit state 250.

In exit state 250, the system may continue to operate, but without a sufficient number of mirrored boot devices to continue operation in the event of another failure. For example, in a system consisting of two mirrored boot devices, if one device fails and cannot be repaired or replaced, or if reintegration of a repaired or replaced device fails, the system may continue to operate with the single remaining boot device.

As shown by the dashed lines in FIG. 2, a system may transition from repair state 230 back to compensation activity state 220. This may occur if a second mirrored boot device fails while a first failed device is being repaired or replaced, or while waiting for the first failed device to be repaired or replaced. Further, the system may transition back from reintegration activity state 240 to either compensation activity state 220 or repair state 230 in similar circumstances—if a second device fails while reintegrating a first device, or a repaired/replacement device exhibits signs of failure while being reintegrated.

Figure 3:
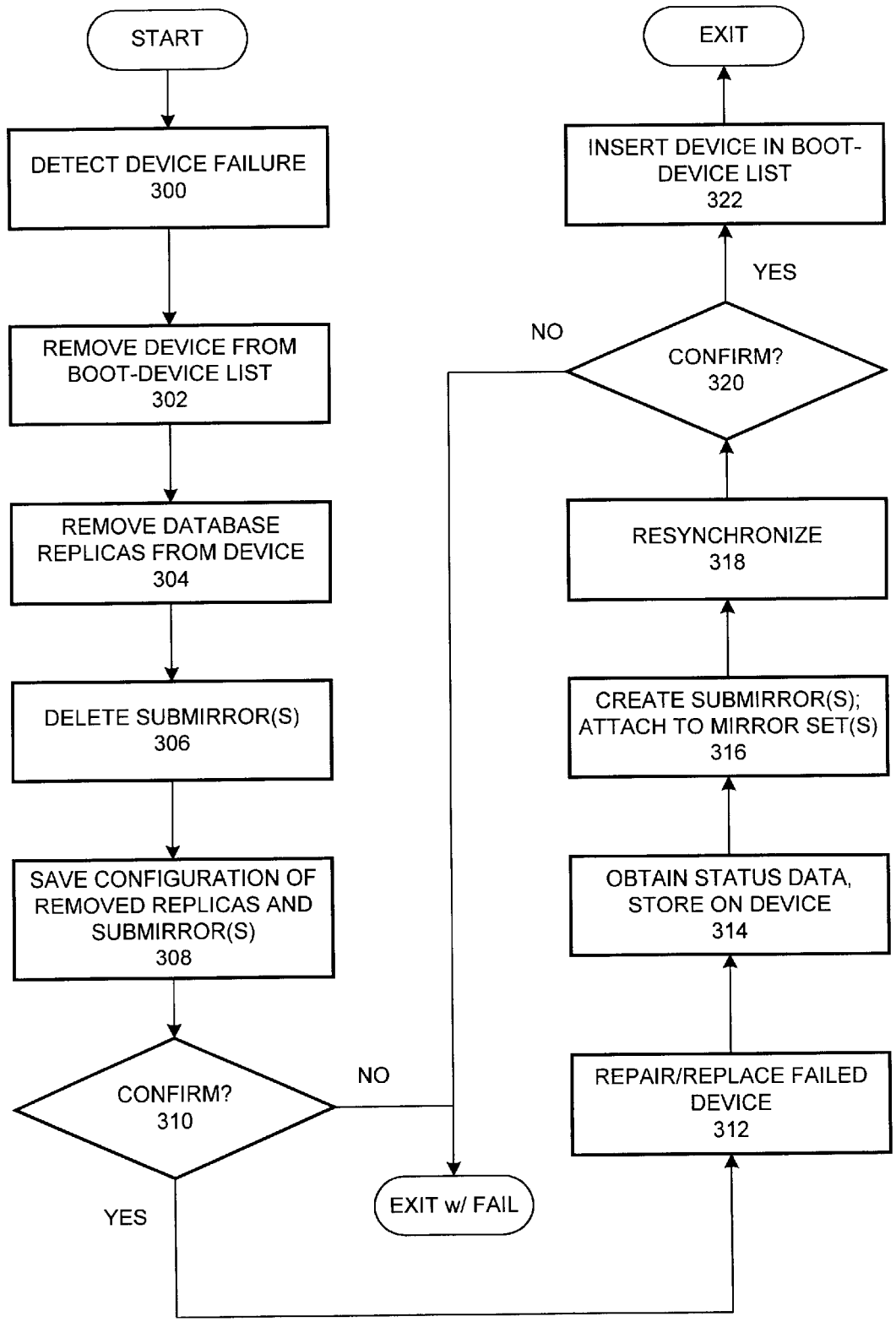
FIG. 3 is a flowchart demonstrating one method of recovering from the failure of a mirrored boot device in accordance with an embodiment of the present invention.

FIG. 3 is a flowchart demonstrating a method of recovering from the failure of one device in a set of mirrored boot devices (e.g., disk drives), according to one embodiment of the invention. The method of the invention illustrated in FIG. 3 is described here as it may be applied within a computer system consisting of two boot devices. This method may, however, be applied for virtually any number of mirrored boot devices greater than or equal to two.

In the illustrated embodiment of the invention, each boot device is partitioned identically, into one or more partitions, with each physical partition corresponding to one sub-mirror. Each pair of sub-mirrors (i.e., one from each device)

defines one mirror. Multiple copies or replicas of a state database (e.g., three) are stored on each device (e.g., in different partitions). The state database includes configuration information regarding the mirror(s) and sub-mirrors and their status. Also, the state database and/or the system module that performs the mirroring (e.g., Solstice DiskSuite) may also track the number, location and status of state database replicas. When the status or configuration of a mirror changes, each replica is updated. The system's mirroring module may handle the creation and maintenance of the state database replicas as well as the mirroring of data. In particular, the system mirroring module may be configured to update state database replicas when there is a configuration change (e.g., removal of a sub-mirror) or a status change (e.g., failure of a sub-mirror).

In one suitable environment for implementing this method, the computer system is one node of a SunCluster™ operating the Solaris operating system and the Solstice DiskSuite mirroring utility. In this environment, each of the two mirrored boot devices will normally store three copies of the state database.

In state 300 of the illustrated method, a failure is detected in one of the boot devices (e.g., a read or write failure). Illustratively, the determination of failure may be made by software or hardware that is performing the mirror operations or that is configured to execute this method of recovery, or by a separate software or hardware module that is configured to monitor the boot devices and/or the mirroring operations. For example, the computer system implementing this method may operate a program or other set of computer executable instructions for monitoring or examining the status of the system. Yet further, a human operator may detect the failure and then initiate one or more scripts or programs to perform the illustrated recovery procedure. Thus, in state 300, the software or hardware module(s) performing this method of recovery may be notified of a device failure by an internal or external process or procedure.

In state 302, the failed device is removed from a list or other data structure that specifies the order in which the computer system will attempt to boot from the mirrored boot devices. The list of boot devices may, for example, be stored on an NVRAM (Non-Volatile Random Access Memory). Thus, unless and until the failed device is returned to the list, the system will not attempt to boot from the failed device, and can only boot from the other device.

In state 304, the state database replicas stored on the failed device are removed. This action, and any other part of the recovery procedure, may be logged to facilitate the computer system's recovery after the failure is corrected, or to return the system to an appropriate state in the event the system crashes, power is cut off, or there is some other failure.

In state 306, the device's sub-mirror(s) is/are deleted from their mirror sets. As a result, in the stated configuration for this method (i.e., only two boot devices) only one sub-mirror will remain for each mirror. State database replicas on the other device may be updated to indicate this change in configuration.

In state 308, information concerning the removed state database replicas (e.g., the number of replicas, their locations) and the change in sub-mirror configuration is stored. Illustratively, the information may be stored on the other, unfailed, device, and may be used to restore the original configuration during reintegration.

In state 310, the system ensures that the device's state database replicas sub-mirror(s) have been deleted. In an alternative embodiment of the invention, each activity may be separately confirmed. Confirmation of these activities helps ensure that the system will not attempt to write to or read from the failed device. If the confirmation is successful, the illustrated recovery procedure continues at state 310. Otherwise, the procedure exits with a failure. In this method, the compensation activity described in conjunction with FIG. 2 may comprise states 302–310.

In state 312 the failed device is repaired or replaced. As part of the repair/replacement procedure, the repaired/replacement device may be partitioned and/or formatted in the same manner as the failed device. The appropriate partition configuration may, for example, be copied from the unfailed boot device. In one embodiment of the invention, the failed device is repaired or replaced without powering down or rebooting the computer system.

Because the contents of the unfailed device are valid and up-to-date, the system can continue to operate and can even be rebooted without the failed device. Illustratively, if the mirroring operations require a quorum, such a quorum is available in the form of the multiple state database replicas stored on the unfailed device.

In state 314, configuration information is retrieved (e.g., from the unfailed device) and written to the repaired/replacement device. In particular, the retrieved information identifies the number of state database replicas that were stored on the failed device and their location (e.g., partition), as well as the configuration of sub-mirrors that were removed from the failed device. As part of state 314, the state database replicas are recreated on the repaired/replacement device, with the same configuration as prior to the device failure (plus any necessary updates).

In state 316, sub-mirrors are recreated on the repaired/replacement device, with the same configuration as before the failure, and the sub-mirrors are attached to their respective mirror sets. In particular, each participating partition of the repaired/replacement device is defined as a sub-mirror, and the sub-mirrors are added to their mirror sets. The state database replicas are updated accordingly.

In state 318, the contents of the sub-mirrors in each mirror are resynchronized. More specifically, the contents of each sub-mirror (e.g., partition) of the unfailed device are copied to their corresponding sub-mirror (partition) of the repaired/replacement device. In the environment described above, wherein device mirroring is performed by Solstice DiskSuite, resynchronization may occur automatically, as one part of the process of attaching sub-mirrors.

In state 320 the system confirms that the necessary state database replicas and sub-mirrors have been created, and that the sub-mirrors have been reintegrated and their contents resynchronized. Any of these confirmations may, alternatively, be performed after the individual activities. If confirmation cannot be made, the illustrated procedure may exit with an error.

In state 322, the repaired/replacement device is added to the list that specifies the order in which the computer system will attempt to boot from the mirrored boot devices. After state 322, the system may return to a state in which the boot devices are monitored for failure.

In the procedure described in FIG. 3, the compensation activities described in conjunction with FIG. 2 may comprise states 302–310, while the reintegration activities may comprise states 314–322.

Any or all of the various activities performed as part of recovering from the failure of a mirrored boot device may be logged or otherwise recorded. As described above, for example, information regarding the status or configuration of a failed device may be stored on a device that has not failed, for retrieval and use after the failed device is repaired or replaced. In addition, however, logging the progress of the recovery procedure may facilitate the return of the system to an appropriate state in the event of a system failure, power loss, failure of another device, etc.

Different embodiments of the invention may be configured to perform three phases of recovery described above—detection of a boot device failure, initiation of compensating activity and reintegration of a repaired/replacement device—in a fully manual fashion, via one or more automated procedures, or through some combination of manual and automatic operations.

In particular, a system administrator or operator may choose one of a number of policies for facilitating recovery from the failure of a boot device. At one extreme, the system administrator, operator or a third party (e.g., software for monitoring devices) detects a device failure, initiates compensating actions such as those described above, and initiates reintegration of a repaired/replacement device. At the other extreme, a process may be executed to monitor the boot devices for failure, initiate compensating activity and, upon detection of the installation of a repaired or replacement device, initiate reintegration activity.

A number of scripts may be provided for use by a system operator or for invocation by an automated process. Such scripts may be configured to detect the failure of a state database replica or sub-mirror, remove state database replicas and sub-mirrors from a failed device, remove a failed device from a list of boot devices, detect the replacement of a failed device, partition a repair/replacement device, create new state database replicas and sub-mirrors, resynchronize sub-mirrors, etc.

In order to isolate a failed device as quickly as possible, it may be advantageous to automate at least the failure detection and compensating activities phases of recovery. By doing so, a failed device is removed from its mirror sets (e.g., its state database replicas are deleted), and the list of devices from which the system may boot, as soon as possible.

Figure 4:
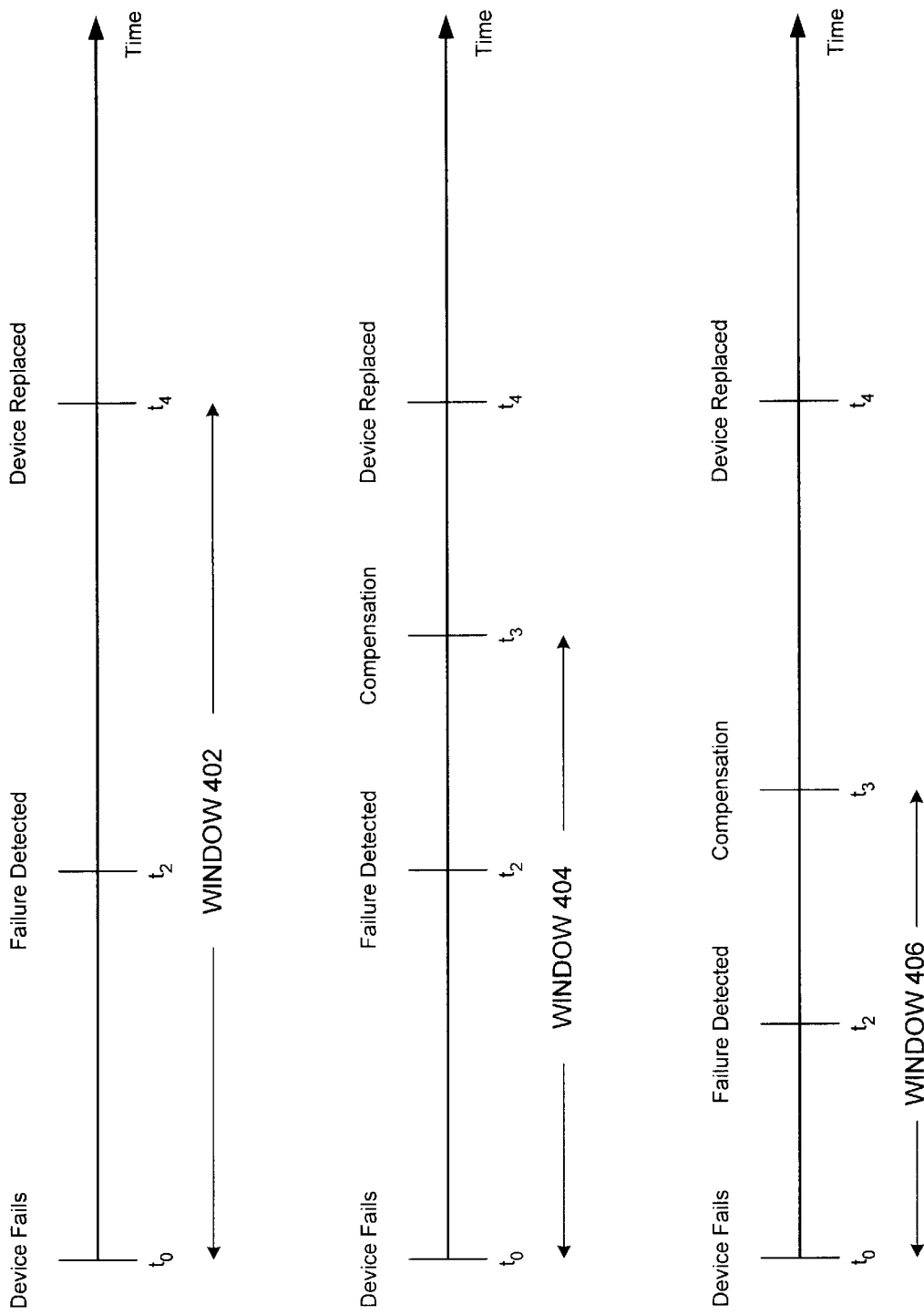
FIG. 4 demonstrates the decreased vulnerability of attempting to boot from a failed device in accordance with an embodiment of the invention.

FIG. 4 demonstrates how a "window of vulnerability"—during which a boot device has failed and a computer system may attempt to boot from the failed device—is affected by implementing an embodiment of the invention described above.

Window 402 is typical of the vulnerability faced by computer systems that do not implement an embodiment of the invention. In particular, window 402 indicates that after a boot device fails, at time index to, the system is vulnerable to booting or attempting to boot from a failed device (e.g., having stale data) until the failure is detected (at time index $t_2$) and finally replaced at time index $t_4$.

When the compensation activity described above is implemented in an embodiment of the invention, at time index $t_3$, the window of vulnerability shrinks as indicated by window 404. In particular, because the failed device is removed from a list of boot devices and/or its state database replicas are removed, the system will not attempt to boot from the failed device after the compensating activity has been performed.

Further, if an automatic form of detection is implemented (e.g., by executing a device monitoring utility), the time indices $t_2$ and $t_3$ can be advanced, thereby decreasing the window of vulnerability even further, as indicated by window 406.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of recovering from failure of a mirrored boot device, the method comprising:

detecting failure of a first device in a set of mirrored boot devices for a computer, wherein each of said mirrored boot devices stores one or more copies of state data regarding said mirroring;

removing said first device from a stored set of devices from which the computer may boot; and removing said first device from said set of mirrored boot devices;

wherein said removing said first device from a set of devices from which the computer may boot is performed automatically upon said detection of said failure of said first device.

2. The method of claim 1, further comprising:

replacing said first device with a replacement device;

adding said replacement device to said set of mirrored boot devices; and adding said replacement device to said set of devices from which the computer may boot.

3. The method of claim 2, wherein said adding said replacement device to said set of mirrored boot devices comprises:

retrieving said state data from a second device in said set of mirrored boot devices; and storing said state data on said replacement device.

4. The method of claim 2, wherein said adding said replacement device to said set of mirrored boot devices is performed automatically upon detection of said replacement of said first device.

5. The method of claim 1, wherein said set of mirrored boot devices consists of two devices prior to said removal of said first device from said set of mirrored boot devices.

6. The method of claim 1, wherein said one or more copies of state data comprise three copies of said state data.

7. The method of claim 1, wherein said removing said first device from said set of mirrored boot devices comprises attempting to remove said one or more copies of said state data from said first device.

8. The method of claim 7, wherein said removing said first device from said set of mirrored boot devices further comprises recording, on a second device in said set of mirrored boot devices, information concerning a configuration of said one or more copies of state data on said first device.

9. The method of claim 1, further comprising automatically detecting replacement of said first disk drive with a replacement disk drive.

10. The method of claim 1, wherein said state data comprises one or more of:

the number of devices in said set of mirrored boot devices; and an identification of said first device.

11. The method of claim 1, wherein said state data comprises one or more of:

an identification of a first mirror; and an identification of a sub-mirror of said first mirror.

12. The method of claim 1, wherein said state data identifies a configuration of said first device for said mirroring.

13. The method of claim 1, further comprising:
attempting to delete one or more sub-mirrors from said first device.

14. The method of claim 1, further comprising:
updating a version of said state data on a second device in said set of mirrored boot devices to reflect a change in configuration of said set of mirrored boot devices.

15. A method of recovering from the failure of one device in a set of mirrored devices configured for booting a computer system, comprising:
detecting the failure of a first device in a set of two mirrored boot devices of a computer system;
disabling the computer system from booting from said first device;
attempting to remove said first device from said set of mirrored boot devices;
determining that said first device has been replaced with a replacement device;
adding said replacement device to said set of mirrored boot devices; and enabling the computer system to boot from said replacement device;
wherein said attempting comprises attempting to delete one or more sub-mirrors from said first device.

16. The method of claim 15, wherein said disabling comprises removing said first device from a list of devices from which the computer system may boot.

17. The method of claim 15, wherein said attempting comprises attempting to delete a first set of mirror state data from said first device, wherein said mirror state data identifies a configuration of said first device for said mirroring.

18. The method of claim 17, wherein said attempting further comprises storing information concerning a configuration of said first set of mirror state data on said first device.

19. The method of claim 15, wherein said attempting comprises updating a second set of mirror state data on said second device in said set of mirrored boot devices to reflect a change in configuration of said set of mirrored devices.

20. The method of claim 15, wherein said adding comprises:
retrieving a set of mirror state data from said second device; and
storing said set of mirror state data on said replacement device.

21. The method of claim 15, wherein said adding comprises:
restoring, to said replacement device, a configuration of said mirror state data from said first drive;
wherein said configuration of said mirror state data was saved after said failure of said first device.

22. The method of claim 15, wherein said enabling comprises adding said first device to a list of devices from which the computer system may boot.

23. The method of claim 15, further comprising:
determining which device in said set of mirrored boot devices contains valid data by searching a list of devices from which the computer system may boot for an identity of one of said mirrored boot devices.

24. A computer readable storage medium storing instructions that, when executed by a computer, cause the computer to perform a method of recovering from failure of a mirrored boot device, the method comprising:
detecting failure of a first device in a set of mirrored boot devices for a computer, wherein each of said mirrored boot devices stores one or more copies of state data regarding said mirroring;
removing said first device from a stored set of devices from which the computer may boot; and
removing said first device from said set of mirrored boot devices;
wherein said removing said first device from a set of devices from which the computer may boot is performed automatically upon said detection of said failure of said first device.

25. A computer system comprising a set of devices from which the system may boot, comprising:
a set of devices configured to boot the computer system, wherein contents of said devices are mirrored;
mirror configuration data, wherein said mirror configuration data is replicated on each of said devices;
a boot device list configured to identify devices from which the computer may boot;
a compensation module configured to:
remove a failed device, of said set of devices, from said boot device list; and
delete said failed device from said set of devices; and
a reintegration module configured to:
add a replacement for said failed device to said set of devices; and
add said replacement to said boot device list.

26. The computer system of claim 25, wherein said set of devices consists of two devices.

27. The computer system of claim 25, wherein said mirror configuration data comprises data identifying a configuration of said mirrored devices.

28. The computer system of claim 25, wherein said deletion of said failed device comprises deleting said replicated mirror configuration data from said failed device.

29. The computer system of claim 28, wherein said deletion of said failed device further comprises updating said mirror configuration data on a second device in said set of boot devices to reflect said deletion of said failed device.

30. The computer system of claim 25, wherein said addition of said replacement to said set of devices comprises:
replicating said mirror configuration data from a second device in said set of devices onto said replacement.

31. The computer system of claim 30, wherein said addition of said replacement to said set of devices further comprises:
synchronizing said replacement with said second device.

32. A computer system configured to boot from one of a set of mirrored devices, comprising:
a set of boot devices participating in one or more mirrors, with each mirror representing a logical partition mirrored across said boot devices, wherein:
each said mirror comprises a sub-mirror on each of said boot devices; and
each said boot device stores multiple copies of status data regarding said mirrors;
a boot module configured to attempt to boot the computer system from said boot devices in a configurable order; and
a monitor module configured to detect a failure in one of said boot devices;
wherein, upon detection of said failure:
said failed boot device is removed from said specified order;
said status data is attempted to be deleted from said failed boot device; and
said sub-mirrors on said failed boot device are attempted to be deleted from said mirrors.

33. The computer system of claim 32, wherein after said failed boot device is replaced with a replacement boot device:
said replacement boot device is populated with said status data;
sub-mirrors for each of said mirrors are created on said replacement boot device; and
said replacement device is added to said specified order.

34. A computer readable storage medium storing instructions that, when executed by a computer, cause the computer to perform a method of recovering from the failure of one device in a set of mirrored devices configured for booting a computer system, the method comprising:
detecting the failure of a first device in a set of two mirrored boot devices of a computer system;
disabling the computer system from booting from said first device;
attempting to remove said first device from said set of mirrored boot devices;
determining that said first device has been replaced with a replacement device;
adding said replacement device to said set of mirrored boot devices; and
enabling the computer system to boot from said replacement device;
wherein said attempting comprises attempting to delete one or more sub-mirrors from said first device.

35. A method of recovering from failure of a mirrored boot device, comprising:
detecting failure of a first device in a set of mirrored boot devices for a computer, wherein each of said mirrored boot devices stores one or more copies of state data regarding said mirroring;
removing said first device from a set of devices from which the computer may boot; and
removing said first device from said set of mirrored boot devices;
wherein said removing said first device from said set of mirrored boot devices comprises attempting to remove said one or more copies of said state data from said first device.

36. The method of claim 35, further comprising:
replacing said first device with a replacement device;
adding said replacement device to said set of mirrored boot devices; and
adding said replacement device to said set of devices from which the computer may boot.

37. The method of claim 35, wherein said one or more copies of state data comprise three copies of said state data.

38. The method of claim 35, wherein said removing said first device from said set of mirrored boot devices further comprises recording, on a second device in said set of mirrored boot devices, information concerning a configuration of said one or more copies of state data on said first device.

39. The method of claim 35, wherein said state data identifies a configuration of said first device for said mirroring.

40. The method of claim 35, further comprising:
attempting to delete one or more sub-mirrors from said first device.

41. The method of claim 35, further comprising:
updating a version of said state data on a second device in said set of mirrored boot devices to reflect a change in configuration of said set of mirrored boot devices.

42. A computer readable medium storing instructions that, when executed by a computer, cause the computer to perform a method of recovering from failure of a mirrored boot device, comprising:
detecting failure of a first device in a set of mirrored boot devices for a computer, wherein each of said mirrored boot devices stores one or more copies of state data regarding said mirroring;
removing said first device from a stored set of devices from which the computer may boot; and
removing said first device from said set of mirrored boot devices;
wherein said removing said first device from said set of mirrored boot devices comprises attempting to remove said one or more copies of said state data from said first device.

43. A method of recovering from failure of a mirrored boot device, comprising:
detecting failure of a first device in a set of mirrored boot devices for a computer, wherein each of said mirrored boot devices stores one or more copies of state data regarding said mirroring;
removing said first device from a set of devices from which the computer may boot; and
removing said first device from said set of mirrored boot devices;
wherein said state data identifies a configuration of said first device for said mirroring.

44. The method of claim 43, further comprising:
replacing said first device with a replacement device;
adding said replacement device to said set of mirrored boot devices; and
adding said replacement device to said set of devices from which the computer may boot.

45. The method of claim 43, wherein said one or more copies of state data comprise three copies of said state data.

46. The method of claim 43, wherein said state data further comprises one or more of:
the number of devices in said set of mirrored boot devices; and
an identification of said first device.

47. The method of claim 43, wherein said state data further comprises one or more of:
an identification of a first mirror; and
an identification of a sub-mirror of said first mirror.

48. The method of claim 43, further comprising:
attempting to delete one or more sub-mirrors from said first device.

49. The method of claim 43, further comprising:
updating a version of said state data on a second device in said set of mirrored boot devices to reflect a change in configuration of said set of mirrored boot devices.

50. A computer readable medium storing instructions that, when executed by a computer, cause the computer to perform a method of recovering from failure of a mirrored boot device, comprising:
detecting failure of a first device in a set of mirrored boot devices for a computer, wherein each of said mirrored boot devices stores one or more copies of state data regarding said mirroring;
removing said first device from a set of devices from which the computer may boot; and
removing said first device from said set of mirrored boot devices;

wherein said state data identifies a configuration of said first device for said mirroring.

51. A method of recovering from the failure of one device in a set of mirrored devices configured for booting a computer system, comprising:

detecting the failure of a first device in a set of two mirrored boot devices of a computer system;

disabling the computer system from booting from said first device;

attempting to remove said first device from said set of mirrored boot devices;

determining that said first device has been replaced with a replacement device;

adding said replacement device to said set of mirrored boot devices; and enabling the computer system to boot from said replacement device;

wherein said attempting comprises attempting to delete a first set of mirror state data from said first device, said mirror state data identifying a configuration of said first device for said mirroring.

52. The method of claim 51, wherein said disabling comprises removing said first device from a list of devices from which the computer system may boot.

53. The method of claim 51, wherein said attempting further comprises storing information concerning a configuration of said first set of mirror state data on said first device.

54. The method of claim 51 wherein said attempting comprises updating a second set of mirror state data on said second device in said set of mirrored boot devices to reflect a change in configuration of said set of mirrored devices.

55. The method of claim 51, wherein said adding comprises:

retrieving a set of mirror state data from said second device; and storing said set of mirror state data on said replacement device.

56. The method of claim 51, wherein said adding comprises:

restoring, to said replacement device, a configuration of said mirror state data from said first drive;

wherein said configuration of said mirror state data was saved after said failure of said first device.

57. The method of claim 51, wherein said enabling comprises adding said first device to a list of devices from which the computer system may boot.

58. The method of claim 51, further comprising:

determining which device in said set of mirrored boot devices contains valid data by searching a list of devices from which the computer system may boot for an identity of one of said mirrored boot devices.

59. A computer readable medium storing instructions that, when executed by a computer, cause the computer to perform a method of recovering from the failure of one device in a set of mirrored devices configured for booting a computer system, comprising:

detecting the failure of a first device in a set of two mirrored boot devices of a computer system;

disabling the computer system from booting from said first device;

attempting to remove said first device from said set of mirrored boot devices;

determining that said first device has been replaced with a replacement device;

adding said replacement device to said set of mirrored boot devices; and enabling the computer system to boot from said replacement device;

wherein said attempting comprises attempting to delete a first set of mirror state data from said first device, said mirror state data identifying a configuration of said first device for said mirroring.

\* \* \* \* \*